United States Patent

[11] 3,627,605

| [72] | Inventor | James L. Taylor |
| | | Greensboro, N.C. |
| [21] | Appl. No. | 879,588 |
| [22] | Filed | Nov. 24, 1969 |
| [45] | Patented | Dec. 14, 1971 |
| [73] | Assignee | Burlington Industries, Inc. |
| | | Greensboro, N.C. |

[54] METHOD FOR MAKING BONDED FABRIC
3 Claims, No Drawings

[52] U.S. Cl. ..................................................... 156/148,
156/306, 156/324, 156/229
[51] Int. Cl. ......................................................... D03c 19/00
[50] Field of Search ............................................ 156/148,
324, 306, 229

[56] References Cited
UNITED STATES PATENTS

| 3,397,101 | 8/1968 | Rausing | 156/229 |
| 2,830,003 | 8/1958 | Mason | 117/122 X |
| 3,439,865 | 3/1969 | Port et al. | 229/53 |

Primary Examiner—Carl D. Quarforth
Assistant Examiner—Gary G. Solyst
Attorney—Cushman, Darby & Cushman ABSTRACT: Woven polyethylene/polypropylene fabrics made by weaving a bicomponent polyethylene/polypropylene olyethylene laminated tape yarn, the fabric being bonded at the points where ends and picks of the tape yarn cross by heat and pressure. The tape yarn is prepared by cutting into strips a laminate comprising outer layers of polyethylene, bonded to an inner layer of polypropylene. The laminate may be made in conventional fashion by extruding or casting films of the indicated composition. The strips are preferably oriented either before or after cutting.

METHOD FOR MAKING BONDED FABRIC

This invention is concerned with the preparation of woven fabrics from laminated strips of polyethylene and polypropylene.

It is well known that films of polypropylene are not readily heat-sealable by conventional techniques. However, polyethylene, on the other hand, is readily heat sealed by heating it to the point where it becomes tacky and excellent bonds can be achieved between two layers or films of polyethylene in this way. The purpose of the present invention is to take advantage of the heat-sealable characteristic of polyethylene and the well-known strength and the desirable properties of polypropylene to prepare a woven fabric having certain unique advantages.

Broadly stated, the invention contemplates preparing a sandwichlike or laminated bicomponent film of polyethylene/polypropylene/polyethylene, cutting this film into tapes or strips and then weaving a fabric therefrom, the fabric being bonded at points where ends and picks of the bicomponent yarn cross by means of heat and pressure.

The bicomponent tape may be in an oriented form or it may be oriented by stretching either the bicomponent film before slitting or the tape itself after slitting. Orientation may be in the longitudinal and/or transverse directions and preferably is at least in the longitudinal direction.

Any desired woven construction may be made with the bicomponent tapes of the invention and it is not essential that all of the points where the warp and filling cross be bonded together. In other words, only selected crossover points may be bonded together if desired and, in some cases, there may be an advantage to using one or more other types of yarns in the warp and/or filling.

Bonding of the bicomponent yarns at their crossover points may be conveniently accomplished by heating the yarns to the softening point of the polyethylene and pressing together until the yarns have cooled and solidified. Because the polyethylene is heat sealable at a temperature which is lower than the softening temperature of polypropylene, the temperature required is less than that at which the polypropylene is effected, so that no shrinking or degradation of the polypropylene occurs, even if the polypropylene is in the oriented state. Usually the heat bonding (polyethylene to polyethylene) can be effected at temperatures in the range of 190° F. to 280° F., depending upon the particular polyethylene resin selected and the degree of orientation, if any, received by the yarn or tapes during manufacture.

Fabrics made according to this invention may be used, for example, as stabilized scrims, self-sealing fabrics for the production of commercial bags, or nonravelling primary and secondary carpet backings, which have the added advantage that they may be bonded together without the use of hot melt films or special adhesives.

Polyethylene/polypropylene/polyethylene films, from which the bicomponent yarns of the present invention may be made, can themselves be made by casting or extruding sandwiches comprising an intermediate polypropylene film with a top and bottom polyethylene film, using conventional techniques and equipment as known in the art, for example, as shown in U.S. Pats. 3,400,190 and 3,397,101.

After extruding or casting the film, it is cooled and cut into tapes of the desired width (e.g. one thirty-second to one-half inch). The tapes may then be oriented by stretching in the conventional manner to improve their tensile strength and they are then woven into fabrics. As noted earlier, orientation may also be carried out on the film before slitting. In either case, orientation may be in one or several directions, usually in two directions perpendicular to each other. This reduces the thickness of the film or tape and, as noted, increases the strength thereof. The degree of orientation may vary but usually will be in the range of three to eight times in each direction of orientation.

The invention is illustrated as follows:

A bicomponent film of polyethylene/polypropylene/polyethylene of one-sixteenth inch thickness was cast and cooled; subsequently it was slit into strips of approximately ½ inch width, and the strips were oriented by biaxial stretching to a thickness of one thirty-second inch and a width of one-fourth inch. The oriented tapes were woven into a fabric which was heated at a temperature of 190° F. until the polyethylene softened. Light pressure was applied where the ends and picks of the yarns, came together, to effect the desired bonding.

The woven, bonded fabrics as made herein have markedly reduced tendencies to ravel and are less subject to slippage and fabric distortion than nonwoven fabrics or conventionally woven, unbonded fabrics of thermoplastic material, and as a result they are particularly advantageous for such uses as carpet backing, scrims and bag materials.

The scope of the invention is defined in the following claims wherein what is claimed is:

1. A process for making a bonded plastic woven fabric which comprising forming a laminated three-layer film of an intermediate polypropylene film with a top and bottom polyethylene film, cutting said film into tape, weaving a fabric using said tape as warp and filling, and heating the fabric to a temperature sufficient to soften the polyethylene and effect bonding between said warp and filling at the points where they cross and contact each other.

2. A process as in claim 1 wherein the fabric is heated at a temperature of 190° F. to 280° F.

3. A process as in claim 1, wherein the film is cut into tape, and the tape is oriented by stretching before being woven into fabric.

* * * * *